(12) United States Patent
Bhagavathy et al.

(10) Patent No.: US 8,611,728 B2
(45) Date of Patent: Dec. 17, 2013

(54) VIDEO MATTING BASED ON FOREGROUND-BACKGROUND CONSTRAINT PROPAGATION

(75) Inventors: Sitaram Bhagavathy, Plainsboro, NJ (US); Joan Llach, Princeton, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 85 days.

(21) Appl. No.: 13/138,384

(22) PCT Filed: Jan. 5, 2010

(86) PCT No.: PCT/US2010/000009
§ 371 (c)(1),
(2), (4) Date: Aug. 9, 2011

(87) PCT Pub. No.: WO2010/093408
PCT Pub. Date: Aug. 19, 2010

(65) Prior Publication Data
US 2011/0293247 A1     Dec. 1, 2011

Related U.S. Application Data

(60) Provisional application No. 61/207,261, filed on Feb. 10, 2009.

(51) Int. Cl.
| | | |
|---|---|---|
| H04N 5/93 | (2006.01) | |
| H04N 9/80 | (2006.01) | |
| G11B 27/00 | (2006.01) | |
| G06K 9/34 | (2006.01) | |
| G06K 9/00 | (2006.01) | |
| G06K 9/74 | (2006.01) | |
| G06G 5/00 | (2006.01) | |

(52) U.S. Cl.
USPC ........... 386/282; 386/239; 386/248; 386/278; 386/280; 382/173; 382/174; 382/181; 382/212; 345/640; 345/655; 345/666; 345/681

(58) Field of Classification Search
USPC .......... 386/239, 248, 278, 280, 282; 382/173, 382/174, 181, 212; 345/640, 655, 666, 681
See application file for complete search history.

(56) References Cited

U.S. PATENT DOCUMENTS

2006/0039690 A1   2/2006   Steinberg et al.
2006/0221248 A1   10/2006  McGuire et al.
(Continued)

OTHER PUBLICATIONS

Levin et al, A Closed-Form Solution to Natural Image Matting, Feb. 2008.*

(Continued)

*Primary Examiner* — Daquan Zhao
(74) *Attorney, Agent, or Firm* — Robert D. Shedd; Jermone G. Schaefer (57) ABSTRACT

A method for propagating user-provided foreground-background constraint information for a first video frame to subsequent frames allows extraction of moving foreground objects with minimal user interaction. Video matting is performed wherein constraints derived from user input with respect to a first frame are propagated to subsequent frames using the estimated alpha matte of each frame. The matte of a frame is processed in order to arrive at a rough foreground-background segmentation which is then used for estimating the matte of the next frame. At each frame, the propagated constraints are used by an image matting method for estimating the corresponding matte which is in turn used for propagating the constraints to the next frame, and so on.

16 Claims, 5 Drawing Sheets

(56) References Cited

U.S. PATENT DOCUMENTS

| | | |
|---|---|---|
| 2007/0297645 A1 | 12/2007 | Pace |
| 2008/0037872 A1 | 2/2008 | Lee et al. |
| 2008/0198175 A1* | 8/2008 | Sun et al. .................. 345/629 |

OTHER PUBLICATIONS

Search Report.

Apostoloff et al., "Bayesian Video Matting Using Learnt Image Prior", Proceedings of the 2004 IEEE Computer Society Confernece on Computer Vision and Pattern Recognition, vol. 1, Washington DC, Jun. 2-Jul. 2004, pp. 407-414.

Chuang et al., "Video Matting of Complex Scenes", Proceeding SIGGRAPH '02, vol. 21, No. 3, Jul. 2002, pp. 243-248.

Joshi et al., "Natural Video Matting using Camera Arrays", Proceeding SIGGRAPH '06, vol. 25, No. 3, Jul. 2006, pp. 779-786.

Levin et al., "A Closed-Form Solution to Natural Image Matting", IEEE Transactions on Pattern Analysis and Machine Intelligence, vol. 30, No. 2, Los Alamitos, CA, Feb. 1, 2008, pp. 228-242.

Nagahashi et al., "Image Segmentation Using Iterated Graph Cuts Based on Multi-Scale Smoothing", Computer Vision A ACCV 2007, Berlin Geidelberg, 2007, pp. 806-816.

Wang et al., "An Iterative Optimization Approach for Unified Image Segmentation and Matting", Computer Vision 2005, ICCV 2005, Tenth IEEE International Conference on Beijing, China, vol. 2, Oct. 17-20, 2005.

* cited by examiner

VIDEO MATTING BASED ON FOREGROUND-BACKGROUND CONSTRAINT PROPAGATION

RELATED PATENT APPLICATIONS

This application claims the benefit, under 35 U.S.C. §365 of International Application PCT/US2010, filed Jan. 5, 2010, which was published in accordance with PCT Article 21(2) on Aug. 19, 2010 in English and which claims the benefit of United States provisional patent application No. 61/207,261filed Feb. 10, 2009.

FIELD OF INVENTION

The present invention generally relates to digital image processing, and more particularly to matting methods and apparatus for video images.

BACKGROUND

Image matting is the process of extracting an object from an image with some human guidance. Image matting may be an interactive process which relies on limited user input, usually in the form of a few scribbles, to mark foreground and background regions. Henceforth, "foreground" refers to the object to be extracted, whereas "background" refers to everything else in the image.

Video matting is an extension of image matting wherein the goal is to extract a moving object from a video sequence. Video matting can also be used in video processing devices (including video encoders). For instance, automatic matte extraction can be used to identify a particular region in a video scene (e.g. sky area), and then apply a given processing only to that region (e.g. de-banding or false contour removal). Matte extraction can also be used to guide object detection and object tracking algorithms. For instance, a matte extraction technique could be used to detect the grass area in a soccer video (i.e. the playfield) which could then use to constrain the search range in a ball tracking algorithm.

In moviemaking and television, mattes have been used to composite foreground (e.g. actors) and background (e.g. landscape) images into a final image. The chroma keying (blue screen) technique is a widely used method for matting actors into a novel background. Many of the traditional techniques rely on a controlled environment during the image capture process. With digital images, however, it becomes possible to directly manipulate pixels, and thus matte out foreground objects from existing images with some human guidance. Digital image matting is used in many image and video editing applications for extracting foreground objects and possibly for compositing several objects into a final image.

As mentioned, image matting is usually an interactive process in which the user provides some input such as marking the foreground and possibly the background regions. The simpler the markings are, the more user-friendly the process is. Among the easier-to-use interfaces are those in which the user places a few scribbles with a digital brush marking the foreground and background regions (see FIG. 2A). An image matting process then determines the boundary of the foreground object using the image information along with the user input.

In several image matting methods, the user provides a rough, usually hand-drawn, segmentation called a trimap, wherein each pixel is labeled as a foreground, background, or unknown pixel. (See U.S. Pat. No. 6,135,345 to Berman et al., "Comprehensive method for removing from an image the background surrounding a selected object"; and Y. Y. Chuang et al., "A Bayesian approach to digital matting," Proc. IEEE Conf. on Computer Vision and Pattern Recognition, 2001.) Other methods allow a more user-friendly scribble-based interaction in which the user places a few scribbles with a digital brush marking the foreground and background regions. (See J. Wang et al., "An iterative optimization approach for unified image segmentation and matting," Proc. IEEE Conf. on Computer Vision and Pattern Recognition, 2005; and A. Levin et al., "A closed-form solution to natural image matting," IEEE Trans. on Pattern Analysis and Machine Intelligence, vol. 30, no. 2, pp. 228-242, February 2008.)

In all the above methods, the user input is provided for matting out the foreground from a single image. Video matting is a harder problem as it may involve a moving foreground object. In this case, the user input for one frame may not be accurate for subsequent frames. Moreover, it is labor-intensive to require the user to provide input for each frame in the video.

In the video matting method proposed by Chuang et al., a trimap is provided for each of several keyframes in the video, and the trimaps are interpolated to other frames using forward and backward optical flow. (Y. Y. Chuang et al., "Video matting of complex scenes," ACM Transactions on Graphics, vol. 21, no. 3, pp. 243-248, 2002.) Optical flow-based interpolation, however, is time-consuming, noise sensitive, and unreliable, even for moderate motion levels. Furthermore, optical flow-based interpolation of user-provided scribbles results in the scribbles breaking up over time. Apostoloff et al. describe a method in which trimaps are implicitly propagated from frame to frame by imposing spatiotemporal consistency at edges. (N. E. Apostoloff et al., "Bayesian video matting using learnt image priors," Proc. IEEE Conf. on Computer Vision and Pattern Recognition, 2004.) The complexity of this method, however, can be substantial due to the enforcement of spatiotemporal edge consistency between the original image and the alpha mattes

SUMMARY

In an exemplary embodiment in accordance with the principles of the invention, a method is described for propagating user-provided foreground-background constraint information for a first video frame to subsequent frames, thereby allowing extraction of moving foreground objects in a video stream with minimal user interaction. Video matting is performed wherein the user input (e.g. scribbles) with respect to a first frame is propagated to subsequent frames using the estimated matte of each frame. The matte of a frame is processed in order to arrive at a rough foreground-background segmentation which is then used for estimating the matte of the next frame. At each frame, the propagated input is used by an image matting method for estimating the corresponding matte which is in turn used for propagating the input to the next frame, and so on.

In view of the above, and as will be apparent from the detailed description, other embodiments and features are also possible and fall within the principles of the invention.

BRIEF DESCRIPTION OF THE FIGURES

Some embodiments of apparatus and/or methods in accordance with embodiments of the present invention are now described, by way of example only, and with reference to the accompanying figures in which:

FIGS. 2A-2D illustrate an interactive image matting process, in which

DESCRIPTION OF EMBODIMENTS

Other than the inventive concept, the elements shown in the figures are well known and will not be described in detail. For example, other than the inventive concept, familiarity with digital image processing is assumed and not described herein. It should also be noted that embodiments of the invention may be implemented using various combinations of hardware and software. Finally, like-numbers in the figures represent similar elements.

Figure 2A:
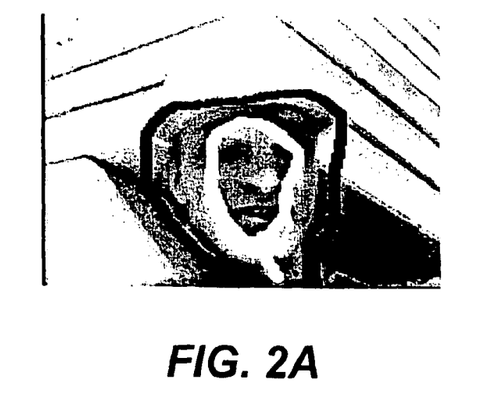
FIG. 2A shows an image or video frame with white scribbles marking foreground and black scribbles marking background.

In general, image matting methods process an input image I which is assumed to be a composite of a foreground image F and a background image B. The color of the $i^{th}$ pixel is assumed to be a linear combination of the corresponding foreground $F_i$ and background $B_i$ colors or intensities:

$$I_i = \alpha_i F_i + (1-\alpha_i) B_i \tag{1}$$

where $\alpha_i$ is the foreground opacity of the $i^{th}$ pixel and $0 \leq \alpha_i \leq 1$. Not all of the quantities on the right hand side of Eq. 1 are known. Thus, for a three-channel color image, there are three equations and seven unknowns for each pixel of the image. Because this is an under-constrained problem, some user input is required to extract a good matte. Typical user input for this purpose may include, for example, placing a few scribbles with a digital brush marking the foreground and background regions, as illustrated in FIG. 2A. In FIG. 2A, the white scribbles denote foreground regions and the black scribbles denote background regions. Given the user input, the foreground image F, the background image B, and the alpha matte (or just "matte") α are estimated.

Figure 1:
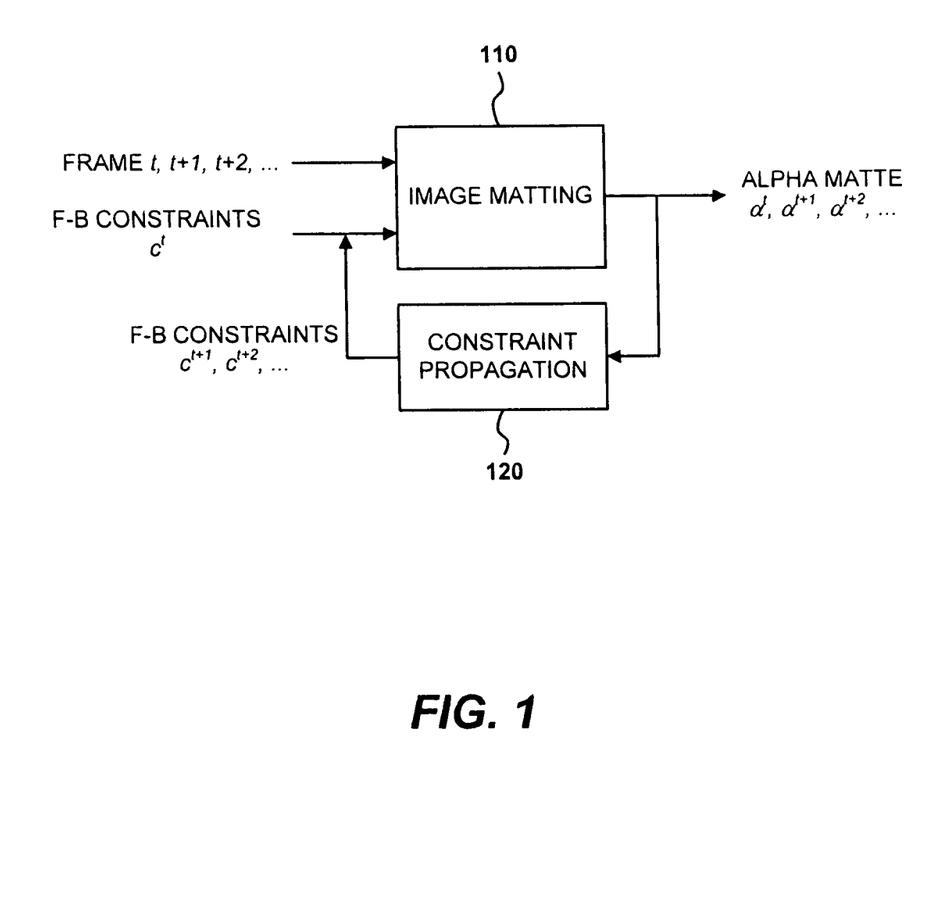
FIG. 1 is a block diagram of an exemplary frame-wise matting process or apparatus.

FIG. 1 is a block diagram of an exemplary frame-wise matting process or apparatus in which the foreground is extracted on a frame-by-frame basis using image matting block 110. As shown in FIG. 1, for a frame at time t, image matting block 110 generates an associated alpha matte $\alpha^t$ based on foreground-background (F-B) constraints $c^t$ that are based on input by a user for frame t or propagated from user input for a previous frame via constraint propagation block 120. In frame t, the constraints $c^t$ are determined by the user-provided input designating foreground and background regions, where all pixels marked as foreground have α=1 and all pixels marked as background have α=0.

Referring to FIG. 1, $c^t$ denotes the F-B constraints of frame t. For the $i^{th}$ pixel, $$c_i^t = \begin{cases} 1 & \text{if pixel } i \text{ is marked as foreground} \\ 0 & \text{if pixel } i \text{ is marked as background} \\ \text{undefined} & \text{otherwise.} \end{cases} \tag{2}$$

Figure 2B:
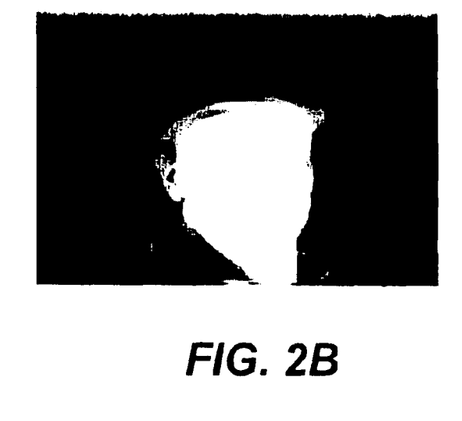
FIG. 2B shows an extracted matte or foreground opacity for FIG. 2A.
Figure 2C:
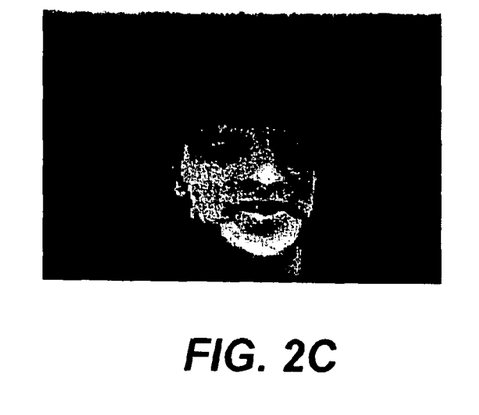
FIG. 2C shows an extracted foreground image.
Figure 2D:
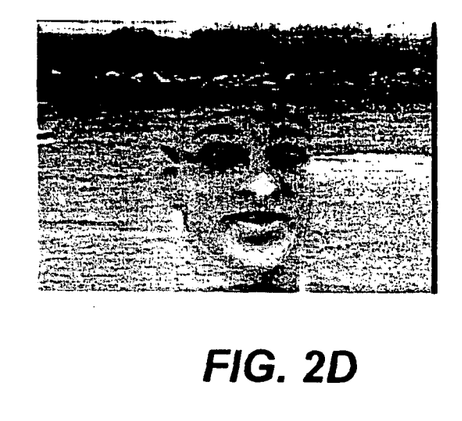
FIG. 2D shows the foreground object composited with a novel background image.

The image matting method 110 assumes the constraints $\alpha_i^t=1$ for pixels with $c_i^t=1$ and $\alpha_i^t=0$ for pixels with $c_i^t=0$, where $\alpha_i^t$ denotes the alpha value of the $i^{th}$ pixel in frame t. FIG. 2B shows the matte ($\alpha^t$) obtained for frame t based on the user-provided scribbles ($c^t$) in FIG. 2A. FIG. 2C shows the extracted foreground object and FIG. 2D shows an application of the matting in which the extracted foreground object is composited with a novel background image.

In an exemplary embodiment, matting block 110 can be implemented in accordance with the matting technique described in A. Levin et al., "A closed-form solution to natural image matting," IEEE Trans. on Pattern Analysis and Machine Intelligence, vol. 30, no. 2, pp. 228-242, February 2008. The matting technique of Levin et al. minimizes a quadratic cost function in the alpha matte under some constraints. Any suitable matting techniques may be used for this purpose.

For each subsequent frame in a video stream, the foreground-background constraints can be derived by propagating the user-input constraints from a previous frame via constraint propagation block 120. An exemplary method for propagating the foreground-background (F-B) constraints from one frame to the next will now be described.

Figure 3:
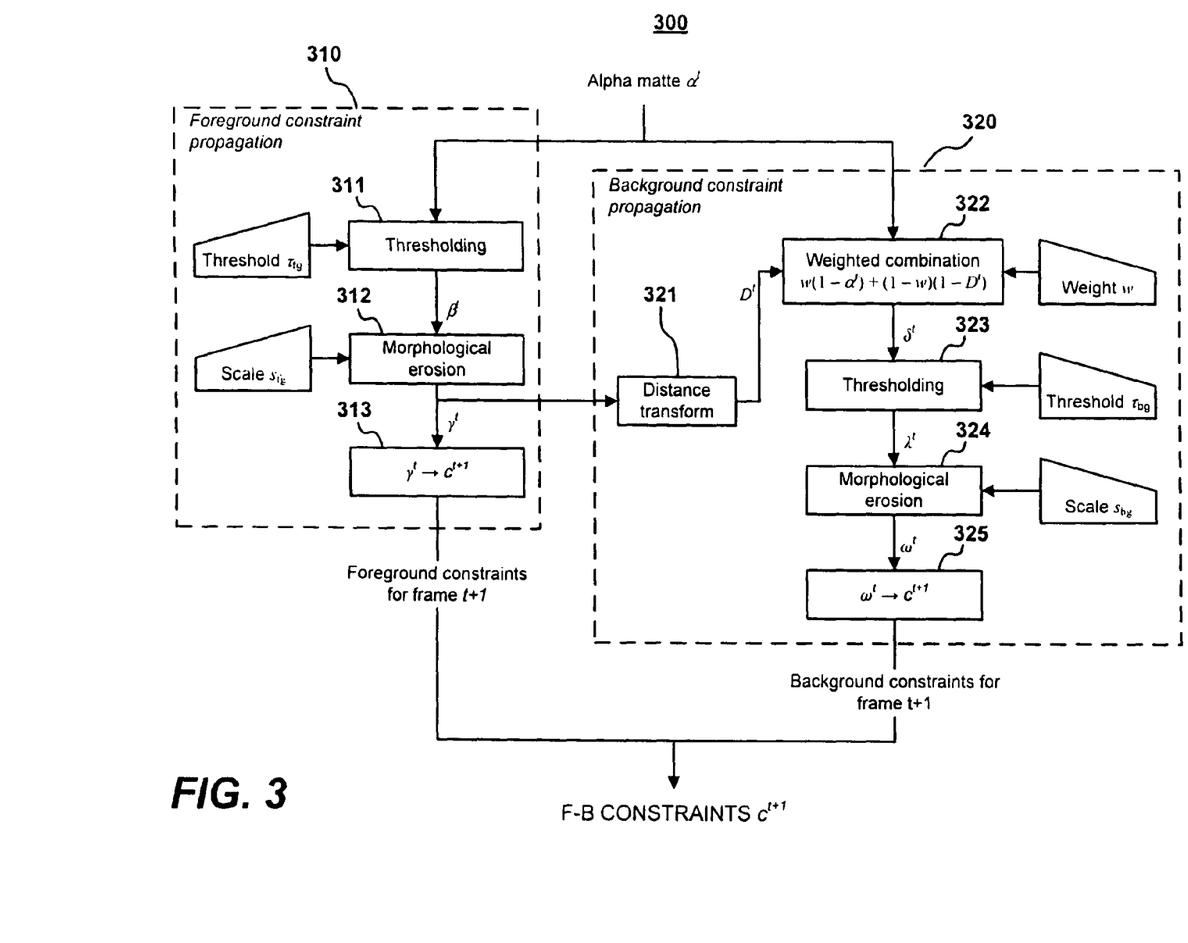
FIG. 3 is a flow diagram of a foreground-background constraint propagation method.

FIG. 3 is a flow diagram of an exemplary method 300 of propagating F-B constraints from one frame to the next is outlined in FIG. 3. FIGS. 4A through 4F show illustrative images pertaining to the method 300. As described in greater detail below, the method 300 uses the alpha matte at frame t to estimate F-B constraints at time t+1. Instead of propagating the constraints (e.g., scribbles or trimap) directly, the method uses the matte at t to generate the constraints for frame t+1. In other words, using the matte ($\alpha^t$) from frame t, the F-B constraints ($c^{t+1}$) for the frame t+1 are obtained.

As shown in FIG. 3, the alpha matte $\alpha_i^t$ for the first of a sequence of frames, i.e., for the frame of time t, is provided, such as from the matting method of FIG. 1, as an input to the method 300. The method 300 comprises foreground constraint propagation procedure 310 and background constraint propagation procedure 320.

The alpha value $\alpha_i^t$ for each pixel i lies in the range [0, 1], where $\alpha_i^t=1$ means that pixel i entirely belongs to the foreground. The higher its alpha value, the greater the foreground component of the pixel. At step 311, a thresholding operation is performed in which the alpha values are compared to a threshold $\tau_{fg}$ to generate a binary field $\beta^t$ such that:

$$\beta_i^t = \begin{cases} 1 & \text{if } \alpha_i^t > \tau_{fg} \\ 0 & \text{otherwise.} \end{cases} \tag{3}$$

Figure 4A:
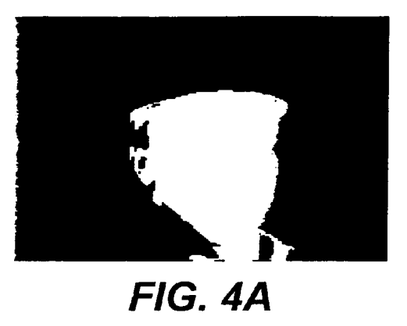
FIGS. 4A through 4F show illustrative images pertaining to the method of FIG. 3.

The thresholding operation thus isolates pixels with a high foreground component. FIG. 4A illustrates the results of the thresholding step 311. FIG. 4A shows the binary field $\beta^t$ obtained by thresholding the alpha matte $\alpha^t$ shown in FIG. 2B. In various exemplary embodiments, values of threshold $\tau_{fg}$ are in the range of 0.5 to 0.9.

At step 312, morphological erosion is performed on the binary field $\beta^t$ generated by the thresholding step:

$$\gamma^t = F_E(\beta^t, E(s_{fg})), \tag{4}$$

where $F_E(.)$ denotes the morphological erosion operator and $E(s)$ denotes a structuring element of scale s. In an exemplary embodiment, $E(5)$ is a disk with a radius of 5 pixels. The structuring element can be any suitable shape, including for example, a square, however, an isotropic shape such as a disk is preferable. The scale of the structuring element is preferably selected based on the desired separation between the foreground and background, and the size of the foreground and/or background, so as avoid excessive erosion of foreground and/or background pixels.

Note that if thresholding step 311 yields a small foreground area that would be eliminated or reduced by morphological erosion step 312 to a foreground area smaller than a predetermined minimum size (such as a size too small to be perceived by a viewer), morphological erosion step 312 may be skipped.

Figure 4B:
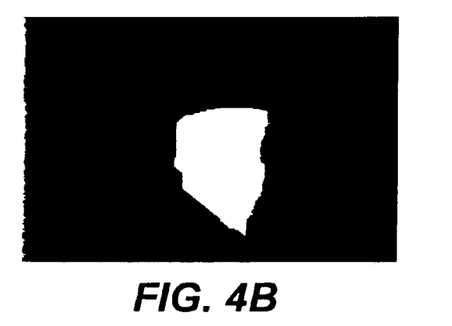

FIG. 4B illustrates the field $\gamma^t$ resulting from the morphological erosion of binary field $\beta^t$ in step 312. In FIG. 4B, the foreground constraints are indicated by the white pixels. By shrinking the regions marked as foreground, the erosion operation ensures that these regions lie within the foreground in frame t+1 even if the foreground (and/or background) has moved by a certain amount. The scale $s_{fg}$ of the structuring element E(.) can be chosen based on the degree of motion of the foreground and/or background.

The foreground constraints for the frame t+1 are then defined at step 313 as follows: $c_i^t = 1$ if $\gamma_i^t = 1$. If $\gamma_i^t = 0$, $c_i^{t+1}$ is yet undefined. Note that $c_i^{t+1}$ may be set as background at another point in the process, as described below, or remain undefined.

In the background propagation procedure 320, the background constraints are determined based on the already-determined foreground constraints $\gamma_i^t$ (FIG. 4B). For each pixel, a lower alpha value ($\alpha_i^t$) indicates a higher background component. By applying a threshold on $(1-\alpha_i^t)$, the background pixels may be isolated. However, it is not desirable that the background-constrained pixels lie very far from the foreground, since this would increase the "fuzzy zone" between background-constrained and foreground-constrained pixels, possibly resulting in inaccurate foreground extraction. In order to achieve this balance, a normalized distance transform is determined at step 321 in accordance with the following expression:

$$D_i^t = \frac{\min_{j \in J} d(i,j)}{\max(H, W)}, \quad (5)$$

where $d(i,j)$ is the spatial distance between pixels i and j, J is the set of all pixels/with $\gamma_j^t = 1$, i.e. $J = \{j | \gamma_j^t = 1\}$, and H and W are the height and width of the frame.

Using the distance transform determined in step 321, a background score of each pixel i is determined at step 322 as a weighted combination of the inverses or complements of the alpha matte and the normalized distance transform, as follows:

$$\delta_i^t = w(1-\alpha_i^t) + (1-w)(1-D_i^t). \quad (6)$$

In an exemplary embodiment, the weight w has a value of 0.8. In various exemplary embodiments, the weight w has a range of 0.5 to 0.9.

Figure 4C:
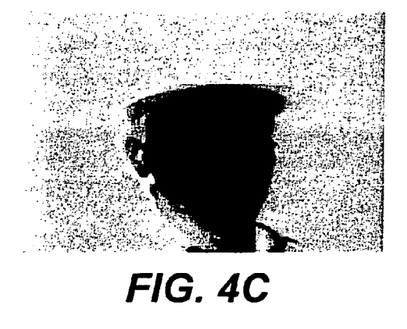

The weighted combination of Eq. 6 yields higher background scores for pixels that have a low alpha value and are situated close to foreground pixels. FIG. 4C illustrates the background score field $\delta^t$ determined in step 322. The brighter the pixel appears in FIG. 4C, the higher its background score.

The background score determined in step 322 is then subjected to a thresholding operation in step 323 in which the background score field $\delta^t$ is compared to a threshold to generate a binary field $\lambda^t$ such that:

$$\lambda_i^t = \begin{cases} 1 & \text{if } \delta_i^t > \tau_{bg} \text{ and } \gamma_i^t = 0 \\ 0 & \text{otherwise,} \end{cases} \quad (7)$$

where $\tau_{bg}$ is a preset background score threshold. An exemplary range of values for threshold $\tau_{bg}$ is 0.5 to 0.9.

Figure 4D:
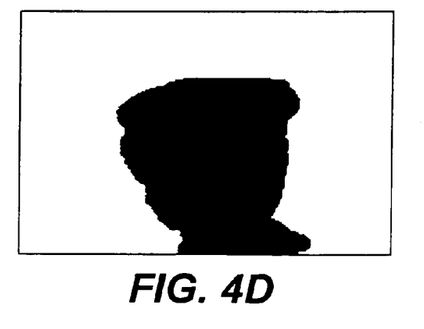

The binary field $\lambda^t$ generated in step 323 is then morphologically eroded in step 324:

$$\omega^t = F_E(\lambda^t, E(s_{bg})) \quad (8)$$

where $F_E(.)$ denotes the morphological erosion operator and E(s) denotes a structuring element of scale s. A variety of structuring elements of various shapes and sizes can be used, as discussed above. FIG. 4D illustrates the field $\omega^t$ resulting from the morphological erosion of binary field $\lambda^t$ in step 324. The white pixels in FIG. 4D indicate the background-constrained pixels. By shrinking the regions marked as background, the erosion operation ensures that these regions lie outside the foreground in frame t+1 even if the foreground (and/or background) has moved by a certain amount.

Note that if thresholding step 323 yields a small background area that would be eliminated or reduced by morphological erosion step 324 to a background area smaller than a predetermined minimum size (such as a size too small to be perceived by a viewer), morphological erosion step 324 may be skipped.

Finally, at step 325, the background constraints for the frame t+1 are determined as follows: $c_i^{t+1} = 0$ if oil $\omega_i^t = 1$. Any $c_i^{t+1}$ that has not already been set to 0 or 1 is left undefined; i.e., such a pixel has an unknown constraint.

Figure 4E:
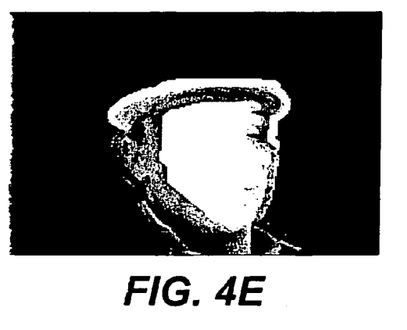
Figure 4F:
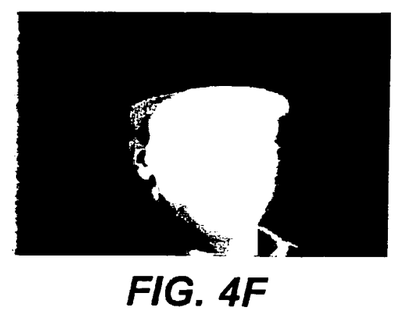

FIG. 4E illustrates the propagated foreground-background constraints for the frame t+1 where white represents foreground constraints ($c_i^{t+1} = 1$) and black represents background constraints ($c_i^{t+1} = 0$). FIG. 4F illustrates the matte $\alpha^{t+1}$ extracted from the frame t+1 using the propagated constraints. The matte $\alpha^{t+1}$ can be generated using the matting method 110 of FIG. 1. This matte is in turn used for deriving the constraints for frame t+2 and so on.

The exemplary method avoids the complexity of motion estimation methods such as correlation-based template matching or optical flow and works reliably over a range of motion levels.

In an exemplary embodiment of a method of propagating F-B constraints from one frame to the next, prior information such as the area of the foreground object and its color distribution in the current frame is used in deriving the F-B constraints for the next frame. All or a subset of the parameters $\tau_{fg}, \tau_{bg}, s_{fg}, s_{bg}$, and w can be automatically adjusted based on the prior information in order to extract an accurate matte. This process can be carried out iteratively until the matte satisfies the constraints imposed by the prior information. In an exemplary embodiment, a brute force process includes trying out multiple values, preferably within predefined ranges, for each parameter and selecting the set of values that best satisfies the prior information. As an example, consider an embodiment in which the prior information includes the area of the foreground. If the foreground constrained area, such as determined by the above-described procedure, is too large, the parameters $\tau_{fg}$, and $s_{fg}$ can be increased, as this will result in fewer foreground constrained pixels. These parameters can be adjusted until the prior constraints are satisfied.

Figure 5:
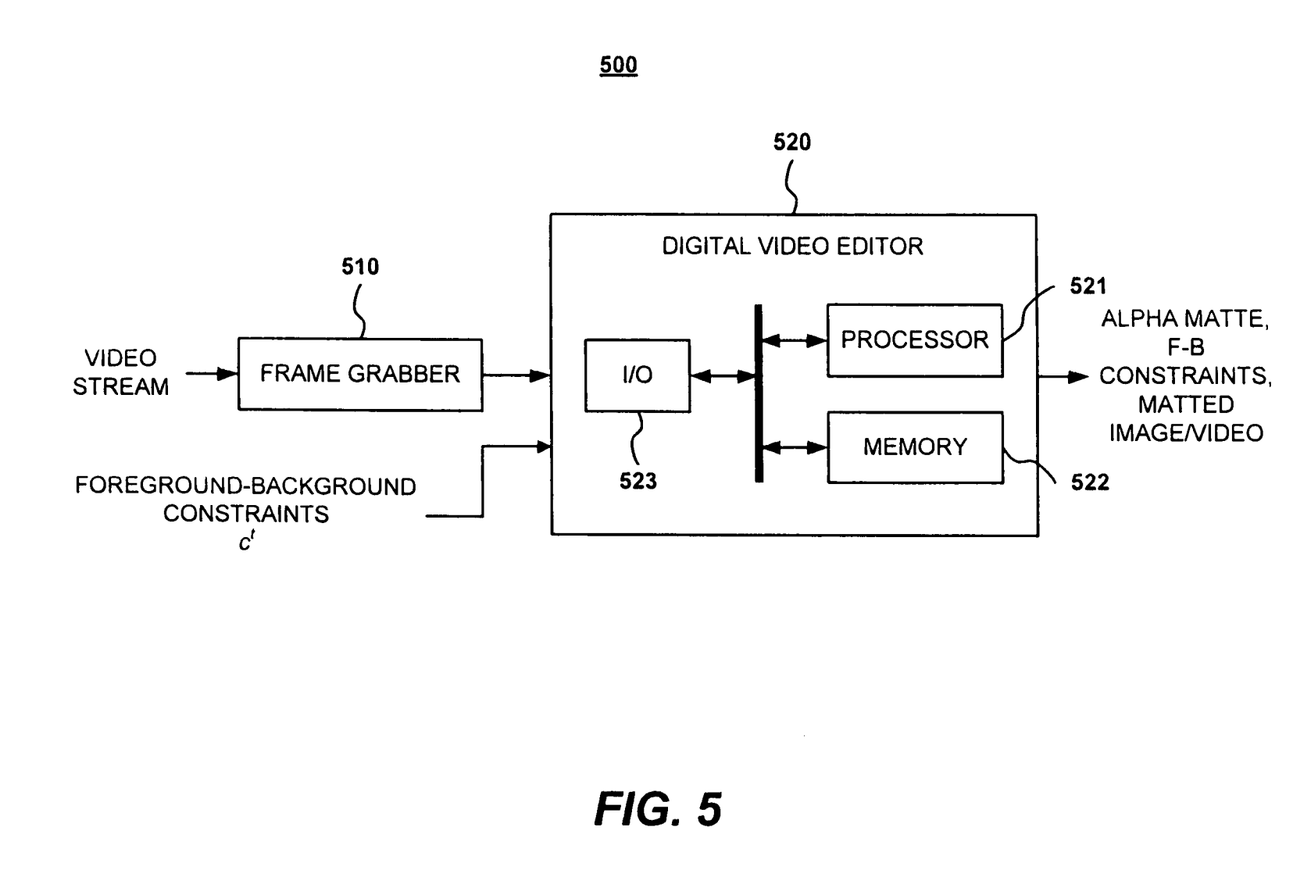
FIG. 5 is a block diagram of an exemplary system embodiment of the present invention.

FIG. 5 is a block diagram of an exemplary system 500 in accordance with the principles of the invention. The system 500 can be used to generate alpha mattes, F-B constraints, and/or perform matting from a video stream. The system 500 comprises a frame grabber 510 and a digital video editor 520.

Frame grabber 510 captures one or more frames of the video stream for processing by digital video editor 520 in accordance with the principles of the invention. Digital video editor 520 comprises processor 521, memory 522 and I/O 523. In an exemplary embodiment, digital video editor 520 may be implemented as a general purpose computer executing software loaded in memory 522 for carrying out constraint propagation and/or matting as described above.

In view of the above, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied in one, or more, integrated circuits (ICs). Similarly, although shown as separate elements, some or all of the elements may be implemented in a stored-program-controlled processor, e.g., a digital signal processor or a general purpose processor, which executes associated software, e.g., corresponding to one, or more, steps, which software may be embodied in any of a variety of suitable storage media. Further, the principles of the invention are applicable to various types of wired and wireless communications systems, e.g., terrestrial broadcast, satellite, Wireless-Fidelity (Wi-Fi), cellular, etc. Indeed, the inventive concept is also applicable to stationary or mobile receivers. It is therefore to be understood that numerous modifications may be made to the illustrative embodiments and that other arrangements may be devised without departing from the spirit and scope of the present invention.

The invention claimed is:

1. A computer implemented method for determining foreground and background constraints for a video stream comprising:
    receiving foreground and background constraints for a video frame via user input;
    generating a matte for the video frame at a frame t using the foreground and background constraints;
    generating foreground constraints for a subsequent video frame at a frame t+1 using the matte; and
    generating background constraints for the subsequent video frame at a frame t+1 using the matte, wherein generating background constraints for the subsequent video frame includes:
        generating a background score field using the matte; and
        performing a thresholding operation on the background score field to generate a binary field.

2. The method of claim 1, wherein generating foreground constraints for the subsequent video frame includes:
    performing a thresholding operation on the matte to generate a binary field.

3. The method of claim 2, wherein generating foreground constraints for the subsequent video frame includes:
    performing a morphological erosion operation on the binary field.

4. The method of claim 1, wherein generating background constraints for the subsequent video frame includes:
    performing a morphological erosion operation on the binary field.

5. The method of claim 1, wherein the background score field includes background scores for pixels of the video frame, the background score for a pixel being directly related to the pixel's proximity to a foreground pixel.

6. The method of claim 1, wherein the background score field includes background scores for pixels of the video frame, the background score for a pixel being inversely related to a corresponding value for the pixel in the matte.

7. The method of claim 1, wherein generating the background score field includes:
    generating a distance transform from the foreground constraints; and
    generating a weighted combination of an inverse of the matte and an inverse of the distance transform.

8. The method of claim 7, wherein generating the weighted combination includes weighting the inverse of the matte by a weight w and the inverse of the distance transform by a weight 1−w, wherein $0.5 \le w \le 0.9$.

9. A digital video editor apparatus having computer instructions in memory, which, when executed, cause the digital video editor apparatus to determine foreground and background constraints for a video stream by performing the steps of:
    receiving foreground and background constraints for a video frame via a user input;
    generating a matte for the video frame at a frame t using the foreground and background constraints;
    generating foreground constraints for a subsequent video frame at a frame t+1 using the matte; and
    generating background constraints for the subsequent video frame at a frame t+1 using the matte, wherein generating background constraints for the subsequent video frame includes:
        generating a background score field using the matte; and
        performing a thresholding operation on the background score field to generate a binary field.

10. The digital video editor apparatus of claim 9, wherein generating foreground constraints for the subsequent video frame includes:
    performing a thresholding operation on the matte to generate a binary field.

11. The digital video editor apparatus of claim 9, wherein generating foreground constraints for the subsequent video frame includes:
    performing a morphological erosion operation on the binary field.

12. The digital video editor apparatus of claim 9, wherein generating background constraints for the subsequent video frame includes:
    performing a morphological erosion operation on the binary field.

13. The digital video editor apparatus of claim 9, wherein the background score field includes background scores for pixels of the video frame, the background score for a pixel being directly related to the pixel's proximity to a foreground pixel.

14. The digital video editor apparatus of claim 9, wherein the background score field includes background scores for pixeis of the video frame, the background score for a pixel being inversely related to a corresponding value for the pixel in the matte.

15. The digital video editor apparatus of claim 9, wherein generating the background score field includes: generating a distance transform from the foreground constraints; and generating a weighted combination of an inverse of the matte and an inverse of the distance transform.

16. The digital video editor apparatus of claim 15, wherein generating the weighted combination includes weighting the inverse of the matte by a weight w and the inverse of the distance transform by a weight 1−w, wherein $0.5 \le w \le 0.9$.

* * * * *